(No Model.)

A. E. HERMAN.
CARRIAGE AXLE NUT.

No. 409,681. Patented Aug. 27, 1889.

Attest.
Walter P. Keene.
Philip J. Inch

Inventor
A. E. Herman
by Walter Donaldson & Co
Atty's.

UNITED STATES PATENT OFFICE.

ADOLPH E. HERMAN, OF TERRE HAUTE, INDIANA.

CARRIAGE-AXLE NUT.

SPECIFICATION forming part of Letters Patent No. 409,681, dated August 27, 1889.

Application filed February 23, 1889. Serial No. 300,956. (No model.)

*To all whom it may concern:*

Be it known that I, ADOLPH E. HERMAN, a citizen of the United States, and a resident of Terre Haute, in the county of Vigo and State of Indiana, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention is designed to provide a simple, inexpensive, and compact nut-lock for vehicle-axles.

Figure 1:
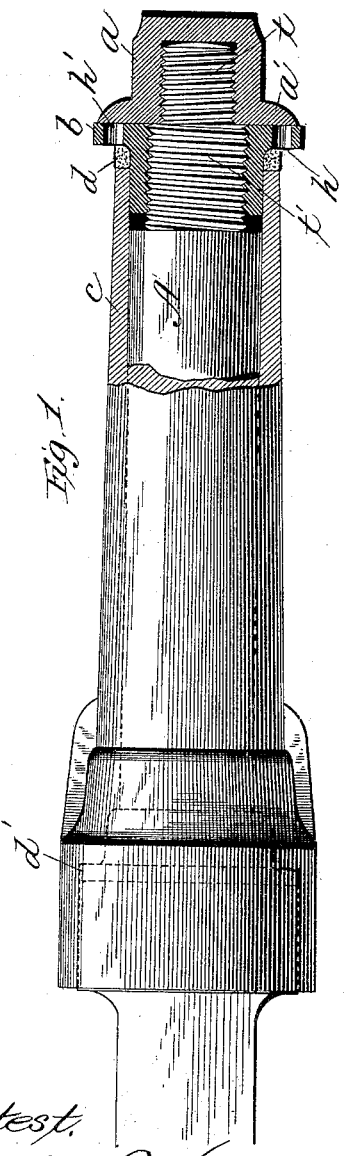
Figure 2:
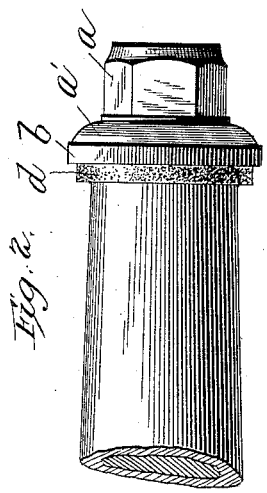

In the drawings, Figure 1 is a side elevation of a box, partly broken away, with the lock in section. Fig. 2 is a side elevation of the nut-lock.

The letter A indicates a common vehicle spindle or axle made similar to others, except that there are two different sets of threads $t$ and $t'$ cut upon the outer end, the two being of different diameters and of different direction.

The letter $b$ indicates a cylindrical nut which screws upon the thread $t'$. This nut consists of a cylindrical body or sleeve and a shoulder or flange. Through this flange, diametrically opposite to each other and parallel to the horizontal axis, there are drilled two holes $h$ and $h'$.

The letter $d$ indicates one or more washers which fit around the sleeve of the nut $b$ and are held in position against the end of the boxing $c$ of the axle by the flange of the nut $b$.

The letter $a$ indicates a set-nut similar to all others used for the same purpose.

To adjust a wheel upon an axle with this mechanism, I simply place an inside washer $d'$ upon the axle, similar to all vehicle-washers. Then place the wheel upon the spindle. Take a leather washer exactly fitting the outside of the nut $b$ and place it upon the same. Then screw the nut $b$ upon the thread $t'$, always in a direction opposite to that in which the wheel rotates. This nut may be adjusted very accurately, allowing no play laterally and at the same time not binding the wheel upon the spindle. When nicely adjusted, I screw the set-nut $a$ up against the nut $b$, the set-nut $a$ always screwing on in a direction opposite to that taken by the nut $b$. When adjusted thus and the set-nut $a$ is screwed up against the nut $b$, the wheel is secure and free from all danger of the nuts running off. I wish to explain, furthermore, that the nut $b$ is forced or screwed into position by means of a wrench similar to other vehicle-wrenches, except that instead of fitting around the outside of a nut it is pressed against the face of the nut, and two spurs or pins which protrude from the face of the wrench are inserted into the holes $h$ $h'$ of the flange upon $b$, thus giving a bearing on the nut $b$.

It will be noticed that the flange of the inner nut extends beyond the periphery of the box and affords a bearing for the wheel-hub. Thus the inner nut with its flange outside the box performs a threefold function. It serves to hold the box to the spindle, retains the washer in place, and affords a bearing for the outer end of the wheel-hub to hold the same against displacement. The flange $a'$ of the outer nut extends over the holes of the inner nut and thus serves to hide them and keep them free from dirt and grease.

I am aware that one nut screwing in an opposite direction to that of another has been used before to lock the second nut, so I make no broad claim to that; but I do claim as my invention, and desire to secure by Letters Patent—

1. In combination, the threaded spindle, the box, a nut having an inward extension threaded upon said spindle, and a flange extending outside and across the end of the box for keeping the same in place, and extending also beyond the periphery of said box to afford a bearing for the wheel-hub, substantially as described.

2. In combination, the threaded spindle, the box, the inner holding-nut having an extension adapted to the bore of the box and screw-threaded upon the spindle, said inner holding-nut having a flange outside the box extending across the end of the same for retaining said box to the spindle, the washer located between the flange and the end of the box, said flanged nut also having holes in its face to receive the wrench-prongs, and an outer nut bearing upon the perforated face of the inner nut, substantially as described.

3. In combination, the spindle having right-and-left-threaded end, the box, the nut having the flange provided with openings for the wrench, and the outer nut also provided with a flange adapted to fit the face of the inner nut and over the openings in the flange thereof, substantially as described.

In testimony that I claim the foregoing as my own I affix my signature in presence of two witnesses.

ADOPLH E. HERMAN.

Witnesses:
  GEO. P. SMITH,
  GEO. M. DAVIS.